US012694330B2

(12) United States Patent     (10) Patent No.:   US 12,694,330 B2

Suo et al.      (45) Date of Patent:     Jul. 28, 2026

(54) METHOD AND APPARATUS FOR TRANSFERRING MACHINE LEARNING MODEL PARAMETER

(71) Applicant: DATANG MOBILE COMMUNICATIONS EQUIPMENT CO., LTD., Beijing (CN)

(72) Inventors: Shiqiang Suo, Beijing (CN); Yingmin Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 727 days.

(21) Appl. No.: 17/921,642

(22) PCT Filed: Feb. 19, 2021

(86) PCT No.: PCT/CN2021/076843
§ 371 (c)(1),
(2) Date: Oct. 27, 2022

(87) PCT Pub. No.: WO2021/218302

PCT Pub. Date: Nov. 4, 2021

(65) Prior Publication Data

US 2023/0169398 A1    Jun. 1, 2023

(30) Foreign Application Priority Data

Apr. 28, 2020    (CN) .......................... 202010349503.5

(51) Int. Cl.
*G06Q 30/00*      (2023.01)
*G06N 20/00*      (2019.01)
(Continued)

(52) U.S. Cl.
CPC ............. *G06N 20/00* (2019.01); *H04L 41/16* (2013.01); *H04W 80/12* (2013.01)

(58) Field of Classification Search
None
See application file for complete search history.

(56) References Cited

U.S. PATENT DOCUMENTS

| | | | |
|---|---|---|---|
| 11,074,599 B2 * | 7/2021 | Stolorz | .................... G06N 5/04 |
| 12,235,840 B2 * | 2/2025 | Doshi | ............... G06F 16/24542 |

(Continued)

FOREIGN PATENT DOCUMENTS

| | | |
|---|---|---|
| CN | 106815644 A | 6/2017 |
| CN | 108076471 A | 5/2018 |

(Continued)

OTHER PUBLICATIONS

560; Brumbaugh; Bighead_A Framework-Agnostic, End-to-End Machine Learning Platform; IEEE-DSAA; pp. 551-2019.*

(Continued)

*Primary Examiner* — Radu Andrei

(74) *Attorney, Agent, or Firm* — KILPATRICK TOWNSEND & STOCKTON LLP

(57) ABSTRACT

A method and apparatus for transferring machine learning model parameters are provided. The method includes: an AI-native service slave management component in a first device receives a machine learning model file and information of a target functional component sent by an AI-native service master management component in a second device; and the AI-native service slave management component distributes the machine learning model file into the target functional component in the first device according to the information of the target functional component.

14 Claims, 5 Drawing Sheets

(51) Int. Cl.
  *H04L 41/16* (2022.01)
  *H04W 80/12* (2009.01)

(56) References Cited

U.S. PATENT DOCUMENTS

| | | | | |
|---|---|---|---|---|
| 2016/0286459 | A1* | 9/2016 | Enomoto | H04W 4/06 |
| 2018/0190032 | A1* | 7/2018 | Barnett | G06T 11/00 |
| 2019/0132203 | A1 | 5/2019 | Wince et al. | |
| 2019/0274101 | A1* | 9/2019 | Price | G06F 1/206 |
| 2021/0049497 | A1* | 2/2021 | Jia | G06N 20/00 |
| 2021/0081920 | A1* | 3/2021 | Spina | G06N 20/00 |
| 2021/0287778 | A1* | 9/2021 | Yousfi | G06T 7/0012 |
| 2022/0161818 | A1* | 5/2022 | Solmaz | G08G 1/096725 |

FOREIGN PATENT DOCUMENTS

| | | |
|---|---|---|
| CN | 109255234 A | 1/2019 |
| CN | 109409528 A | 3/2019 |
| CN | 109445953 A | 3/2019 |
| CN | 109495485 A | 3/2019 |
| CN | 110119808 A | 8/2019 |
| CN | 110147915 A | 8/2019 |
| CN | 110263935 A | 9/2019 |
| WO | 2020080989 A1 | 4/2020 |

OTHER PUBLICATIONS

Joost; Survey on Distributed Machine Learning; Gent University; 33 pages; 2016.*

Samad; White Paper on Machine Learning in Wireless Communication Networks; University of Oulu; 29 pages; 2019.*

Tian Cao Mei. "(non-official translation: Applications of AI and 5G in Wireless Communication)", Apr. 14, 2020, total 12 pages.

Office Action of Corresponding KR Patent Application No. 10-2022-7040107 Dated Jul. 21, 2025.

* cited by examiner

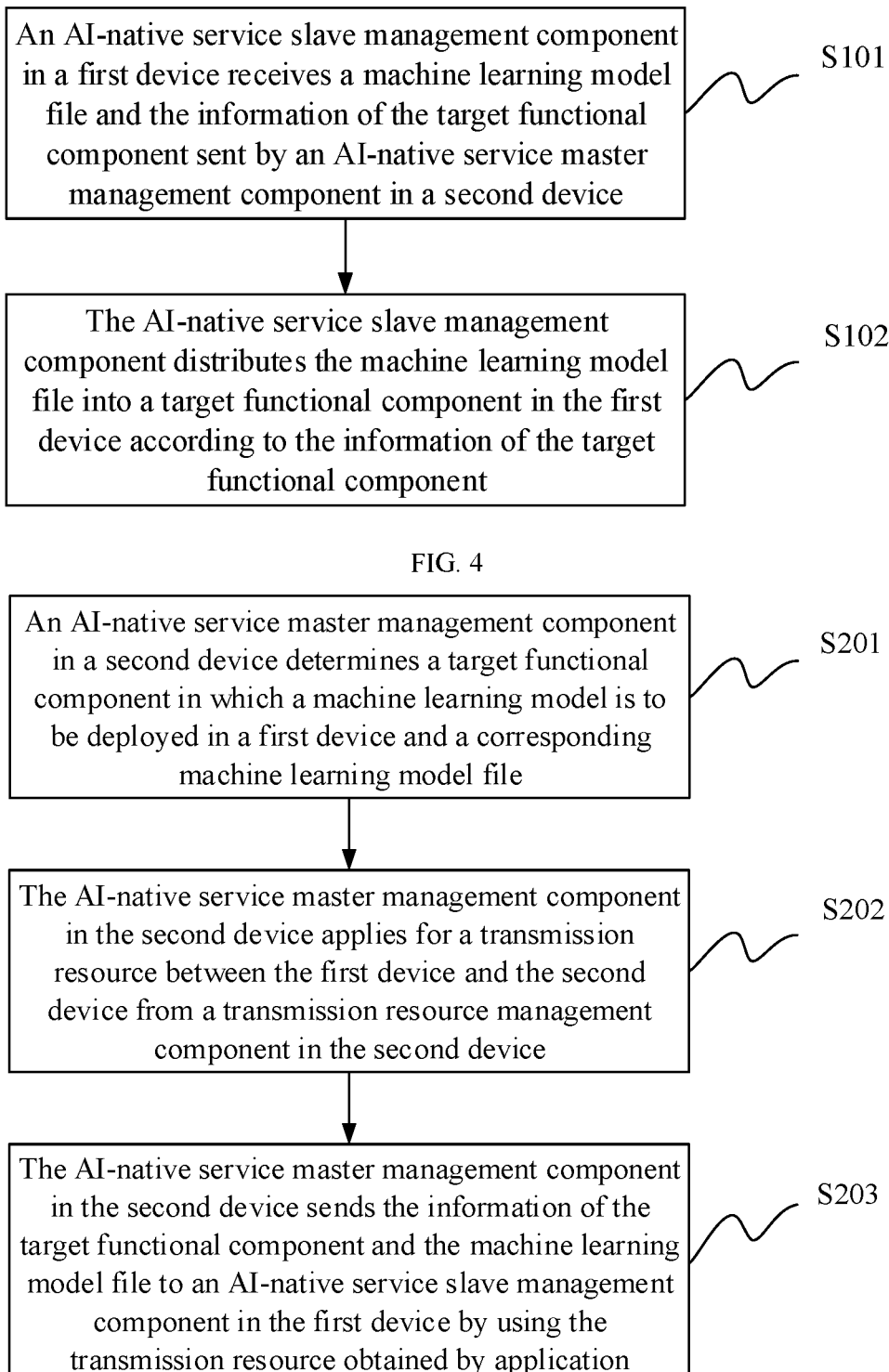

An AI-native service slave management component in a first device receives a machine learning model file and the information of the target functional component sent by an AI-native service master management component in a second device    S101

The AI-native service slave management component distributes the machine learning model file into a target functional component in the first device according to the information of the target functional component    S102

FIG. 4

An AI-native service master management component in a second device determines a target functional component in which a machine learning model is to be deployed in a first device and a corresponding machine learning model file    S201

The AI-native service master management component in the second device applies for a transmission resource between the first device and the second device from a transmission resource management component in the second device    S202

The AI-native service master management component in the second device sends the information of the target functional component and the machine learning model file to an AI-native service slave management component in the first device by using the transmission resource obtained by application    S203

FIG. 5

METHOD AND APPARATUS FOR TRANSFERRING MACHINE LEARNING MODEL PARAMETER

CROSS-REFERENCE OF RELATED APPLICATIONS

The present application is a National Stage of International Application No. PCT/CN2021/076843 filed Feb. 19, 2021, which claims the priority from Chinese Patent Application No. 202010349503.5, filed with the Chinese Patent Office on Apr. 28, 2020 and entitled "Method and Apparatus for Transferring Machine Learning Model Parameters", which is hereby incorporated by reference in its entirety.

FIELD

The present application relates to the field of communication technologies, and in particular, to a method and apparatus for transferring machine learning model parameters.

BACKGROUND

As one of key methods of artificial intelligence, the machine learning was proposed in the 1950s. With the development of machine learning technologies, the Neural Network (NN) or Artificial Neural Network (ANN) has been proposed, which is a general-purpose model to facilitate the construction of models in machine learning inspired by biological neural network. A simple neural network includes an input layer, an output layer and a hidden layer (if needed), and each layer includes neurons.

In order to solve complex nonlinear problems, the number of hidden layers in the designed neural network is gradually increased to form a Deep Neural Network (DNN), and the corresponding learning method is deep machine learning or deep learning. Various types of deep neural network models have been developed, including DNN, Recurrent Neural Network (RNN), Convolutional Neural Network (CNN), etc. Since the 2010s, the deep learning, as an important branch of machine learning, has gained widespread attention and explosive growth.

The development of machine learning is mainly reflected in voice recognition, image recognition and other fields, in which a large number of classic models and algorithms have been deposited. The introduction of machine learning into wireless mobile communication system to solve the problems of the wireless mobile communication system has only emerged in recent years.

However, when the machine learning inference model is inside the wireless mobile communication system, how to deploy/update the machine learning model is a problem to be studied. In particular, when the machine learning model on the user terminal side needs to be updated, it also affects the transmission of the air interface.

SUMMARY

The embodiments of the present application provide a method and apparatus for transferring machine learning model parameters, to implement the deployment/update of the machine learning model when the machine learning inference model is inside the wireless mobile communication system.

On the first device side, a method for transferring machine learning model parameters in a mobile communication system according to an embodiment of the present application includes:

receiving, by an artificial intelligence (AI)-native service slave management component in a first device, a machine learning model file and information of a target functional component sent by an AI-native service master management component in a second device;

distributing, by the AI-native service slave management component, the machine learning model file into the target functional component in the first device according to the information of the target functional component.

Through this method, the AI-native service slave management component in the first device receives the machine learning model file and the information of the target functional component sent by the AI-native service master management component in the second device; and the AI-native service slave management component distributes the machine learning model file to the target functional component in the first device according to the information of the target functional component, to realize the deployment/update of the machine learning model when the machine learning inference model is inside the wireless mobile communication system.

In one embodiment, the AI-native service slave management component is located in an application layer of the first device; and the AI-native service master management component is located in an application layer of the second device.

In one embodiment, the method further includes:

installing, by the target functional component, the machine learning model file.

In one embodiment, the method further includes:

notifying, by the target functional component, the AI-native service slave management component that the machine learning model file has been installed;

applying, by the AI-native service slave management component, for a transmission resource between the first device and the second device from a transmission resource management component in the second device;

applying, by the AI-native service slave management component, for service registration from the AI-native service master management component by using the transmission resource obtained through application; and launching, by the AI-native service slave management component, a service included in a latest machine learning model installed in the target functional component after obtaining a service registration permission from the AI-native service master management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

On the second device side, a method for transferring machine learning model parameters in a mobile communication system according to an embodiment of the present application includes:

determining, by an AI-native service master management component in a second device, a target functional component in which a machine learning model is to be deployed in a first device and a corresponding machine learning model file;

applying, by the AI-native service master management component in the second device, for a transmission resource between the first device and the second device from a transmission resource management component in the second device; and sending, by the AI-native service master management component in the second device, the information of the target functional component and the machine learning model file to an AI-native service slave management component in the first device by using the transmission resource obtained by application.

In one embodiment, the AI-native service slave management component is located in an application layer of the first device; and the AI-native service master management component is located in an application layer of the second device.

In one embodiment, the method further includes:

receiving, by the AI-native service master management component in the second device, a transmission resource application sent by the AI-native service slave management component in the first device, and allocating a transmission resource between the first device and the second device to the AI-native service slave management component.

In one embodiment, the method further includes:

receiving, by the AI-native service master management component in the second device, a service registration application sent by the AI-native service slave management component in the first device, and sending a service registration permission to the AI-native service slave management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

On the first device side, an apparatus for transferring machine learning model parameters in a mobile communication system according to an embodiment of the present application includes:

a memory configured to store program instructions;

a processor configured to invoke the program instructions stored in the memory and execute according to an obtained program:

controlling an AI-native service slave management component in a first device to receive a machine learning model file and information of a target functional component sent by an AI-native service master management component in a second device; and controlling the AI-native service slave management component to distribute the machine learning model file into a target functional component in the first device according to the information of the target functional component.

In one embodiment, the AI-native service slave management component is located in an application layer of the first device; and the AI-native service master management component is located in an application layer of the second device.

In one embodiment, the processor is further configured to invoke the program instructions stored in the memory and execute according to an obtained program:

controlling the target functional component to install the machine learning model file.

In one embodiment, the processor is further configured to invoke the program instructions stored in the memory and execute according to an obtained program:

controlling the target functional component to notify the native service slave management component that the machine learning model file has been installed;

controlling the native service slave management component to apply for a transmission resource between the first device and the second device from a transmission resource management component in the second device;

controlling the AI-native service slave management component to apply for service registration to the AI-native service master management component by using the transmission resource obtained through application; and controlling the AI-native service slave management component to launch a service included in a latest machine learning model installed in the target functional component after obtaining a service registration permission from the AI-native service master management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

On the second device side, an apparatus for transferring machine learning model parameters in a mobile communication system according to an embodiment of the present application includes:

a memory configured to store program instructions;

a processor configured to invoke the program instructions stored in the memory and execute according to an obtained program:

controlling an AI-native service master management component in a second device to determine a target functional component in which a machine learning model is to be deployed in a first device and a corresponding machine learning model file;

controlling the AI-native service master management component in the second device to apply for a transmission resource between the first device and the second device from a transmission resource management component in the second device; and controlling the AI-native service master management component in the second device to send the information of the target functional component and the machine learning model file to an AI-native service slave management component in the first device by using the transmission resource obtained by application.

In one embodiment, the AI-native service slave management component is located in an application layer of the first device; and the AI-native service master management component is located in an application layer of the second device.

In one embodiment, the processor is further configured to invoke the program instructions stored in the memory and execute according to an obtained program:

controlling the AI-native service master management component in the second device to receive a transmission resource application sent by the AI-native service slave management component in the first device, and allocate a transmission resource between the first device and the second device for the AI-native service slave management component.

In one embodiment, the processor is further configured to invoke the program instructions stored in the memory and execute according to an obtained program:

controlling the AI-native service master management component in the second device to receive a service registration application sent by the AI-native service slave management component in the first device, and send a service registration permission to the AI-native service slave management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

On the first device side, another apparatus for transferring machine learning model parameters in a mobile communication system according to an embodiment of the present application includes:

a receiving device, configured to receive a machine learning model file and the information of the target functional component sent by an AI-native service master management component in a second device; and a sending device, configured to distribute the machine learning model file into a target functional component in a first device according to the information of the target functional component.

On the second device side, another apparatus for transferring machine learning model parameters in a mobile communication system according to an embodiment of the present application includes:

a determining device, configured to determine a target functional component in which a machine learning model is to be deployed in a first device and a corresponding machine learning model file;

an application device, configured to apply for a transmission resource between the first device and a second device from a transmission resource management component in the second device; and a sending device, configured to send information of the target functional component and the machine learning model file to an AI-native service slave management component in the first device by using the transmission resource obtained by application.

On the first device side, a third apparatus for transferring machine learning model parameters in a mobile communication system according to an embodiment of the present application includes:

an AI-native service slave management component, configured to receive a machine learning model file and the information of the target functional component sent by an AI-native service master management component in a second device; and distribute the machine learning model file into the target functional component in a first device according to the information of the target functional component; and a functional component, configured to install the machine learning model file.

In one embodiment, the AI-native service slave management component is located in an application layer of the first device.

In one embodiment, the functional component is further configured to notify the native service slave management component that the machine learning model file has been installed; and the native service slave management component is further configured to: apply for a transmission resource between the first device and the second device from a transmission resource management component in the second device; apply for service registration to the AI-native service master management component by using the transmission resource obtained through application; and launch a service included in a latest machine learning model installed in the target functional component after obtaining a service registration permission from the AI-native service master management component.

On the second device side, a third apparatus for transferring machine learning model parameters in a mobile communication system according to an embodiment of the present application includes:

an AI-native service master management component, configured to determine a target functional component in which a machine learning model is to be deployed in a first device and a corresponding machine learning model file; apply for a transmission resource between the first device and a second device from a transmission resource management component in the second device; and send the information of the target functional component and the machine learning model file to an AI-native service slave management component in the first device by using the transmission resource obtained by application; and a transmission resource management component, configured to provide the transmission resource between the first device and the second device.

In one embodiment, the AI-native service master management component is located in an application layer of the second device.

In one embodiment, the apparatus further includes:

a machine learning model library, configured to store machine learning model files.

In one embodiment, the AI-native service master management component is further configured to: receive a transmission resource application sent by the AI-native service slave management component in the first device, and allocate a transmission resource between the first device and the second device for the AI-native service slave management component.

In one embodiment, the AI-native service master management component is further configured to: receive a service registration application sent by the AI-native service slave management component in the first device, and send a service registration permission to the AI-native service slave management component.

Another embodiment of the present application provides a computing device, which includes a memory and a processor, and the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly.

FIG. 4 is a schematic flowchart of a method for transferring machine learning model parameters on the first device side according to an embodiment of the present application.

FIG. 5 is a schematic flowchart of a method for transferring machine learning model parameters on the second device side according to an embodiment of the present application.

DETAILED DESCRIPTION OF THE EMBODIMENTS

Figure 1:
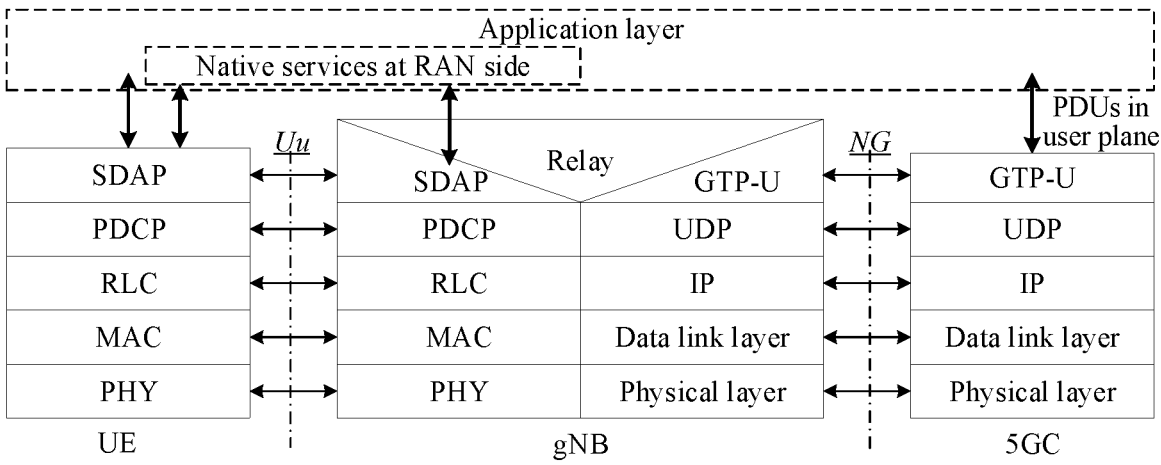
FIG. 1 is a schematic diagram of constructing a start point and an end point of a native service on RAN side respectively in a user plane according to an embodiment of the present application.

The embodiments of the present application will be described clearly and completely below in combination with the accompanying drawings in the embodiments of the present application. The described embodiments are only a part of the embodiments of the present application but not all the embodiments.

The introduction of machine learning into wireless mobile communication system can solve complex problems of the mobile communication system or improve performance. However, due to the complex composition of the wireless mobile communication system and the numerous manufacturers, how to deploy/update the machine learning model trained on the network side to the terminal side has become a systematic problem, which requires a unified solution.

Therefore, the embodiments of the present application provide a method and apparatus for transferring machine learning model parameters, to transfer the machine learning model trained on the network side to the terminal side.

Here, the method and device are based on the same application concept. Since the principle of solving the problem in the method is similar to that in the device, the implementations of the device and method can refer to each other, and the repeated description thereof will be omitted.

The embodiments of the present application may be applicable to various systems, especially a 5G system or a 6G system. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in the embodiments of the present application.

The network device involved in the embodiments of the present application may be a base station, which may include cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, and the rest of the access network may include IP networks. The network device may further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the embodiments.

The embodiments of the present application propose a solution for deploying/updating a machine learning model trained on the system side to the terminal side in wireless mobile communication system by using native services.

The native service described in the embodiments of the present application may, for example, refer to a type of service constructed between the base station and the terminal in the mobile communication system in order to solve the complex problems of the mobile communication system or improve the performance, and is not a function service directly required by the user. The service object thereof is a network itself or an operator, so it is called native service. The machine learning model (its corresponding function) to be deployed can be regarded as a native service, and the deployment or update of the machine learning model can be performed in the manner of service deployment or update. Simply put, the machine learning model can be regarded as an application (APP), and the deployment/update of the model is the download and installation process of the APP The more complex model can be deployed in the manner of a native service, and it is also more conducive to the knowledge protection of the model itself.

Figure 2:
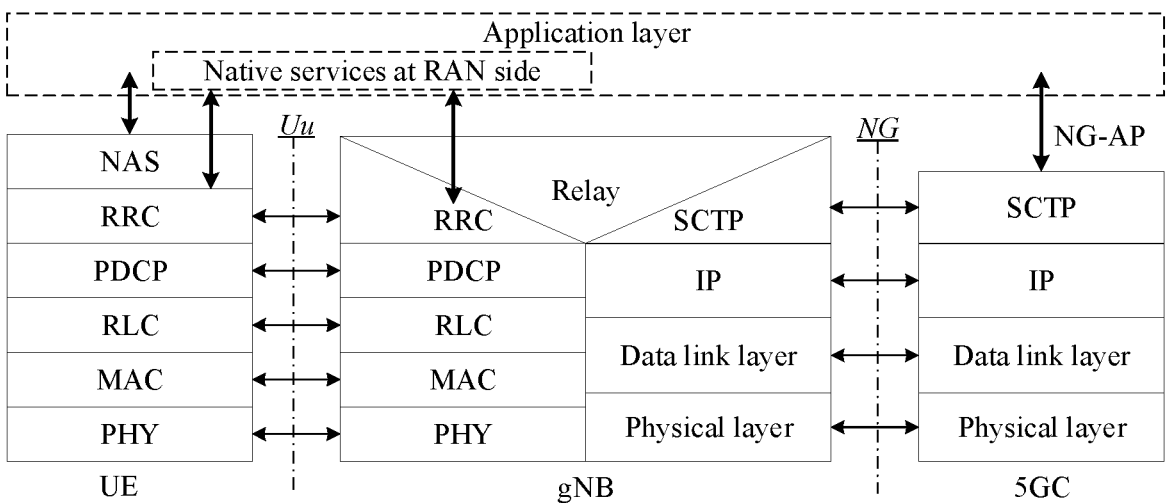
FIG. 2 is a schematic diagram of constructing a start point and an end point of a native service on RAN side respectively in a control plane according to an embodiment of the present application.

A way to construct a start point and an end point of a native service on RAN side (including a base station and a terminal) respectively, as shown in FIG. 1 and FIG. 2, includes a user plane and a control plane respectively.

In one embodiment, the control plane mainly executes processes such as service registration process and radio resource application of native services on the RAN side. Here, the service registration process initiated by the terminal side is taken as an example to illustrate, that is, a specific native service (such as "channel estimation of terminal side" service executed on the terminal side) needs to register with the operating system on the processor where it is located before execution, and needs to obtain the authorization from the base station during registration, to prevent the terminal from arbitrarily executing unauthorized native services. The registration process is generally initiated by an application layer of a main body executing the service (for example, the main body executing the service of the "channel estimation of terminal side" is the terminal), and is processed through a wireless network layer (referring to 5G wireless network layer, which may include RRC, PDCP, RLC, MAC and PHY layers) under the application layer, to form an air interface signal to be sent to the base station; after the base station receives the air interface signal, the signal is processed through a wireless network layer (referring to 5G wireless network layer, which may include PHY, MAC, RLC, PDCP and RRC layers) to obtain the service registration application initiated by the terminal. After checking the application, the base station will confirm the registered information, and then send it to the terminal after being processed through the wireless network layers under the application layer; and the terminal obtains the authorization information from the base station side after receiving the air interface signal and processing the air interface signal through the wireless network layers.

The user plane mainly deals with the user data in native services on the RAN side. The data may be generated by the application layer (such as the test data used by the terminal to perform a measurement service), or may be generated in the wireless network layer under the control of the control plane (such as a reference signal used in the "channel estimation of terminal side" service, which is generated by the PHY layer in the wireless network layer). Here, the test data used by the terminal to perform the measurement service is taken as an example to illustrate. The data is generated by the application layer on the base station side and is processed through the wireless network layer (referring to the 5G wireless network layer, which may include SDAP, PDCP, RLC, MAC and PHY layers), to form an air interface signal to be sent to the terminal; after receiving the air interface signal, the terminal side invokes the measurement service to process the air interface signal.

Figure 3:
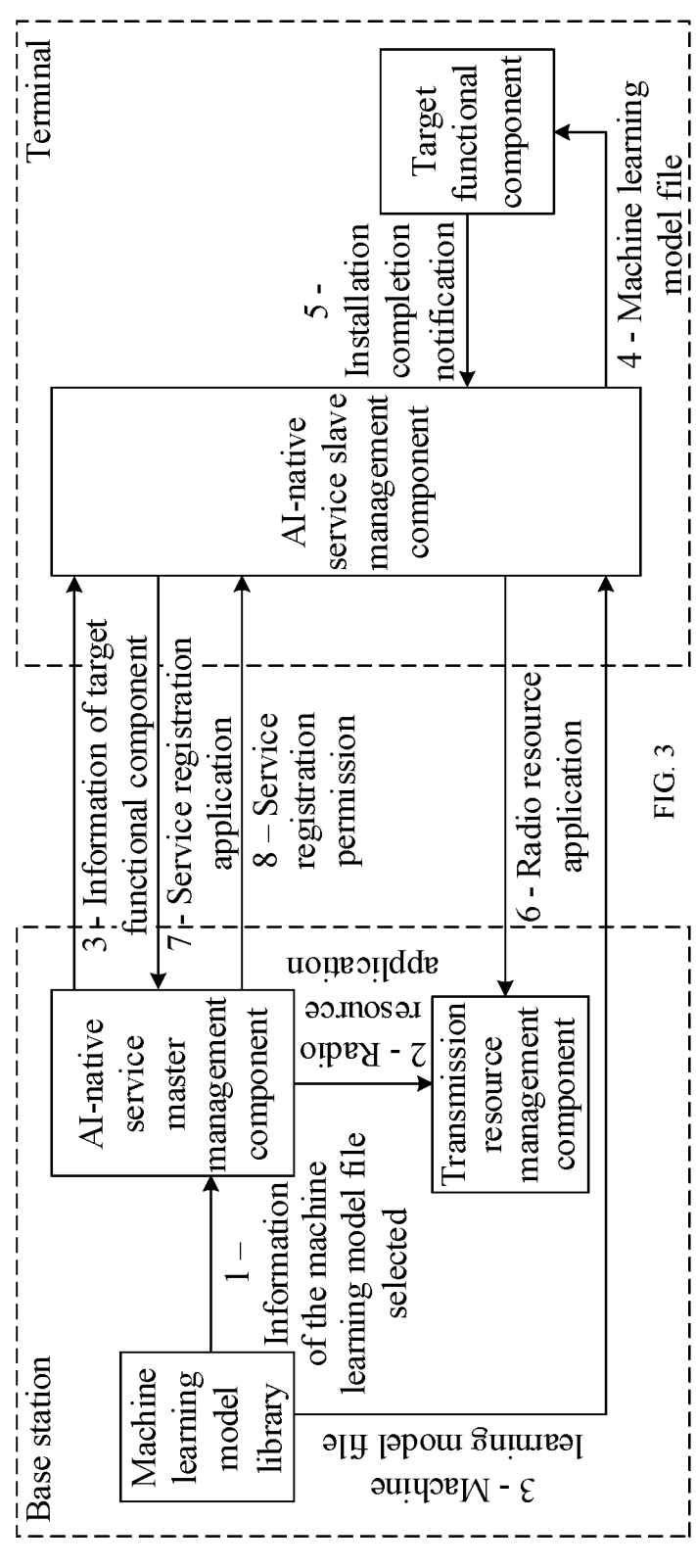
FIG. 3 is a schematic diagram of a main flow of updating a machine learning model according to an embodiment of the present application.

The main flow of updating a machine learning model is as shown in FIG. 3. Based on the above constructed native services of the RAN system, a specific method for deploying/updating a machine learning model is as follows.

Step 1: when the base station decides to deploy/update the machine learning model for a target functional component on the terminal side, an AI-native service master management component in the base station selects a corresponding machine learning model file from a machine learning model library.

Here, the target functional component is, for example, channel estimation, signal detection, channel decoding, Channel Quality Indicator (CQI) measurement, synchronization detection, transmit antenna selection, etc. The AI-native service master management component is located in the application layer on the base station side, and is mainly configured to provide native services with the service registration function and the function of applying for transmission resources between the terminal and the base station. The machine learning model file is generally understood as an executable program file, such as .exe. Generally, multiple files are included and packaged into a compressed file package, such as .zip.

Step 2: the AI-native service master management component in the base station applies for the transmission resource between the terminal and the base station from a transmission resource management component on the base station side.

Step 3: the AI-native service master management component in the base station uses the transmission resource obtained by application to send the machine learning model file from the machine learning model library to an AI-native service slave management component on the terminal side, along with the corresponding information of the target functional component.

The AI-native service slave management component is located in the application layer on the terminal side.

The information of the target functional component includes, for example, the name of the target functional component, as shown in the second column of Table 1.

Step 4: the AI-native service slave management component on the terminal side distributes the machine learning model file to the target functional component on the terminal side according to the received information of the target functional component.

Step 5: the target functional component on the terminal side, after receiving the machine learning model file distributed by the AI-native service slave management component, performs installation and notifies the AI-native service slave management component.

Step 6: the AI-native service slave management component on the terminal side applies for the transmission resource between the terminal and the base station from the transmission resource management component on the base station side.

Step 7: the AI-native service slave management component on the terminal side applies for service registration to the AI-native service master management component in the base station by using the transmission resource obtained by application.

Step 8: the AI-native service slave management component on the terminal side launches a service included in the machine learning model newly deployed/updated in the target functional component after obtaining a service registration permission from the AI-native service master management component on the base station side.

For example, a list of the machine learning model library is shown in Table 1 below, and a compression package of a machine learning model file corresponding uniquely to a machine learning model number can be found according to the machine learning model number.

TABLE 1

| Model Number in the Library | Functional Component | Machine Learning Model Number | Update Date of Machine Learning Model |
|---|---|---|---|
| #80 | Channel Estimation at Terminal side | UECHE001 | 2020 Apr. 1 |
| #81 | Channel Estimation at Terminal side | UECHE002 | 2020 Apr. 11 |
| #82 | Channel Estimation at Terminal side | UECHE003 | 2020 Apr. 28 |
| #83 | Signal Detection at Terminal side | UEDE001 | 2020 Apr. 2 |
| #84 | Signal Detection at Terminal side | UEDE002 | 2020 Apr. 11 |
| #85 | Signal Detection at Terminal side | UEDE003 | 2020 Apr. 25 |
| #86 | Channel Decoding at Terminal side | UECCD001 | 2020 Mar. 21 |
| #87 | Channel Decoding at Terminal side | UECCD002 | 2020 Apr. 1 |

TABLE 1-continued

| Model Number in the Library | Functional Component | Machine Learning Model Number | Update Date of Machine Learning Model |
|---|---|---|---|
| #88 | Channel Decoding at Terminal side | UECCD003 | 2020 Apr. 21 |
| #89 | CQI Measurement at Terminal side | UECQI001 | 2020 Apr. 10 |
| #90 | CQI Measurement at Terminal side | UECQI002 | 2020 Apr. 21 |
| #91 | CQI Measurement at Terminal side | UECQI003 | 2020 Apr. 30 |
| #92 | Synchronization Detection at Terminal side | UESD001 | 2020 Jan. 12 |
| #93 | Synchronization Detection at Terminal side | UESD002 | 2020 Feb. 28 |
| #94 | Synchronization Detection at Terminal side | UESD003 | 2020 Mar. 12 |
| #95 | Selection of Sending Antenna at Terminal side | UETAS001 | 2019 Dec. 20 |
| #96 | Selection at Sending Antenna of Terminal side | UETAS002 | 2020 Jan. 20 |
| #97 | Selection of Sending Antenna at Terminal side | UETAS003 | 2020 Mar. 20 |
| #98 | Detection Algorithm at Base Station side | BSME008 | 2019 Dec. 31 |
| #99 | . . . | . . . | . . . |

Correspondingly, an embodiment of the present application provides a system for deploying/updating a machine learning model using native services, which at least includes a base station side and a terminal side, and the base station side includes an AI-native service master management component, a transmission resource management component, and a machine learning model library; and the terminal side includes an AI-native service slave management component and a target functional component which can apply the machine learning model.

It should also be noted that, in addition to deploying native services on the base station and terminal, when there are units, such as a Centralized Unit (CU) and a Distributed Unit (DU), on the system side, the endogenous services can also be deployed on the CU and DU, to deploy and update the machine learning model in the similar manner.

To sum up, referring to FIG. 4, on the first device side such as a terminal or a base station distributed unit, a method for transferring machine learning model parameters in a mobile communication system according to an embodiment of the present application includes the followings.

S101: an AI-native service slave management component in a first device receives a machine learning model file and the information of the target functional component sent by an AI-native service master management component in a second device.

In one embodiment, the AI-native service slave management component is located in an application layer of the first device; and the AI-native service master management component is located in an application layer of the second device.

S102: the AI-native service slave management component distributes the machine learning model file into a target functional component in the first device according to the information of the target functional component.

In one embodiment, the method further includes:
the target functional component installs the machine learning model file.

In one embodiment, the method further includes:
the target functional component notifies the AI-native service slave management component that the machine learning model file has been installed;
the AI-native service slave management component applies for a transmission resource between the first device and the second device from a transmission resource management component in the second device;
the AI-native service slave management component applies for service registration to the AI-native service master management component by using the transmission resource obtained through application; and
the AI-native service slave management component launches a service included in a latest machine learning model installed in the target functional component after obtaining a service registration permission of the AI-native service master management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

Referring to FIG. 5, on the second device side such as a base station or a centralized unit of a base station, a method for transferring machine learning model parameters in a mobile communication system according to an embodiment of the present application includes the followings.

S201: an AI-native service master management component in a second device determines a target functional component in which a machine learning model is to be deployed in a first device and a corresponding machine learning model file.

In one embodiment, the AI-native service master management component is located in an application layer of the second device.

S202: the AI-native service master management component in the second device applies for a transmission resource between the first device and the second device from a transmission resource management component in the second device.

S203: the AI-native service master management component in the second device sends the information of the target functional component and the machine learning model file to an AI-native service slave management component in the first device by using the transmission resource obtained by application.

In one embodiment, the AI-native service slave management component is located in an application layer of the first device.

In one embodiment, the method further includes:
the AI-native service master management component in the second device receives a transmission resource application sent by the AI-native service slave management component in the first device, and allocates a transmission resource between the first device and the second device for the AI-native service slave management component.

In one embodiment, the method further includes:
the AI-native service master management component in the second device receives a service registration application sent by the AI-native service slave management component in the first device, and sends a service registration permission to the AI-native service slave management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

Figure 6:
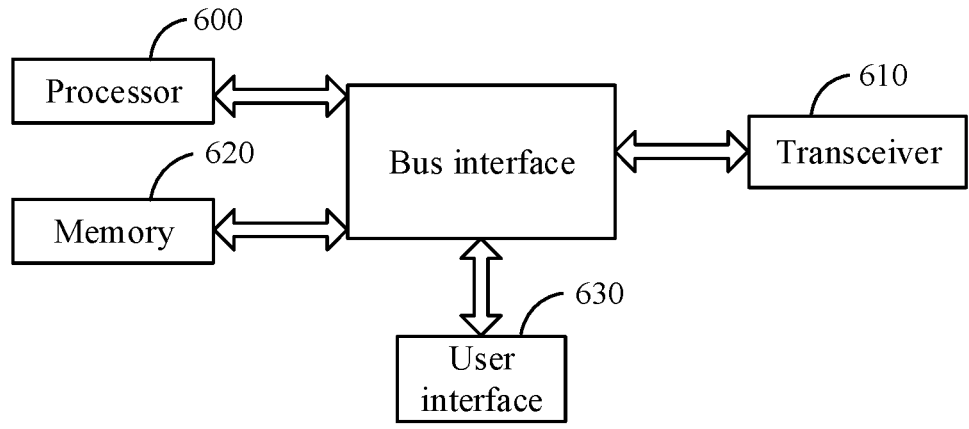
FIG. 6 is a structural schematic diagram of an apparatus for transferring machine learning model parameters on the first device side according to an embodiment of the present application.

Referring to FIG. 6, on the first device side, an apparatus for transferring machine learning model parameters in a mobile communication system according to an embodiment of the present application includes: a memory 620 configured to store program instructions; a processor 600 configured to invoke the program instructions stored in the memory, and execute according to an obtained program: controlling an AI-native service slave management component in a first device to receive a machine learning model file and the information of the target functional component sent by an AI-native service master management component in a second device; and controlling the AI-native service slave management component to distribute the machine learning model file into a target functional component in the first device according to the information of the target functional component.

In one embodiment, the AI-native service slave management component is located in an application layer of the first device; and the AI-native service master management component is located in an application layer of the second device.

In one embodiment, the processor 600 is further configured to invoke the program instructions stored in the memory and execute according to an obtained program:
controlling the target functional component to install the machine learning model file.

In one embodiment, the processor 600 is further configured to invoke the program instructions stored in the memory and execute according to an obtained program:
controlling the target functional component to notify the AI-native service slave management component that the machine learning model file has been installed;
controlling the AI-native service slave management component to apply for a transmission resource between the first device and the second device from a transmission resource management component in the second device;
controlling the AI-native service slave management component to apply for service registration to the AI-native service master management component by using the transmission resource obtained through application; and
controlling the AI-native service slave management component to launch a service included in a latest machine learning model installed in the target functional component after obtaining a service registration permission from the AI-native service master management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

A transceiver 610 is configured to receive and send the data under the control of the processor 600.

Here, in FIG. 6, the bus architecture can include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be elements, i.e., include a transmitter and a receiver, and provide the components for communicating with various other devices over the transmission media. For different user equipment, the user interface 630 may also be the interface for inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 may be Central Processing Component (CPU), Application Specific Integrated Circuit (ASIC), Field-Programmable Gate Array (FPGA) or Complex Programmable Logic Device (CPLD).

Figure 7:
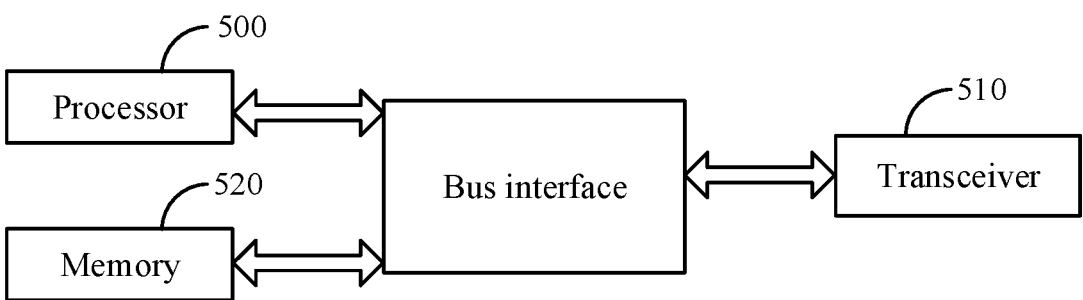
FIG. 7 is a structural schematic diagram of an apparatus for transferring machine learning model parameters on the second device side according to an embodiment of the present application.

Referring to FIG. 7, on the second device side, an apparatus for transferring machine learning model parameters in a mobile communication system according to an embodiment of the present application includes: a memory 520 configured to store program instructions; a processor 500 configured to invoke the program instructions stored in the memory, and execute according to an obtained program: controlling an AI-native service master management component in a second device to determine a target functional component in which a machine learning model is to be deployed in a first device and a corresponding machine learning model file; controlling the AI-native service master management component in the second device to apply for a transmission resource between the first device and the second device from a transmission resource management component in the second device; and controlling the AI-native service master management component in the second device to send information of a target functional component and the machine learning model file to an AI-native service slave management component in the first device by using the transmission resource obtained by application.

In one embodiment, the AI-native service master management component is located in an application layer of the second device.

In one embodiment, the AI-native service slave management component is located in an application layer of the first device.

In one embodiment, the processor 500 is further configured to invoke the program instructions stored in the memory and execute according to an obtained program: controlling the AI-native service master management component in the second device to receive a transmission resource application sent by the AI-native service slave management component in the first device, and allocate a transmission resource between the first device and the second device for the AI-native service slave management component.

In one embodiment, the processor 500 is further configured to invoke the program instructions stored in the memory and execute according to an obtained program: controlling the AI-native service master management component in the second device to receive a service registration application sent by the AI-native service slave management component in the first device, and send a service registration permission to the AI-native service slave management component.

In one embodiment, the first device is a terminal device in the mobile communication system, the second device is a base station device in the mobile communication system, and the transmission resource between the first device and the second device is a wireless transmission resource between the terminal device and the base station device.

In one embodiment, the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

A transceiver 510 is configured to receive and send the data under the control of the processor 500.

Here, in FIG. 7, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be elements, i.e., include a transmitter and a receiver, and provide the components for communicating with various other devices over the transmission media. The processor 500 is responsible for managing the bus architecture and general processing, and the memory 520 may store the data used by the processor 500 when performing the operations.

The processor 500 may be Central Processing Component (CPU), Application Specific Integrated Circuit (ASIC), Field-Programmable Gate Array (FPGA) or Complex Programmable Logic Device (CPLD).

Figure 8:
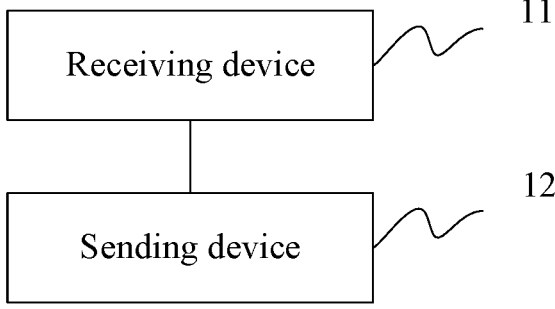
FIG. 8 is a structural schematic diagram of another apparatus for transferring machine learning model parameters on the first device side according to an embodiment of the present application.

Referring to FIG. 8, on the first device side, another apparatus for transferring machine learning model parameters in a mobile communication system according to an embodiment of the present application includes:

a receiving device 11, configured to receive a machine learning model file and the information of the target functional component sent by an AI-native service master management component in a second device; and a sending device 12, configured to distribute the machine learning model file into a target functional component in a first device according to the information of the target functional component.

For example, the apparatus on the first device side may be the AI-native service slave management component.

Figure 9:
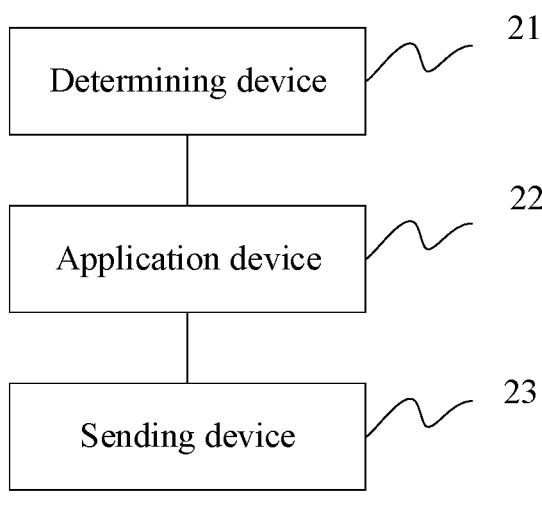
FIG. 9 is a structural schematic diagram of another apparatus for transferring machine learning model parameters on the second device side according to an embodiment of the present application.

Referring to FIG. 9, on the second device side, another apparatus for transferring machine learning model parameters in a mobile communication system according to an embodiment of the present application includes:

a determining device 21, configured to determine a target functional component in which a machine learning model is to be deployed in a first device and a corresponding machine learning model file;

an application device 22, configured to apply for a transmission resource between the first device and a second device from a transmission resource management component in the second device; and a sending device 23, configured to send the information of the target functional component and the machine learning model file to an AI-native service slave management component in the first device by using the transmission resource obtained by application.

For example, the apparatus on the second device side may be the AI-native service master management component.

Figure 10:
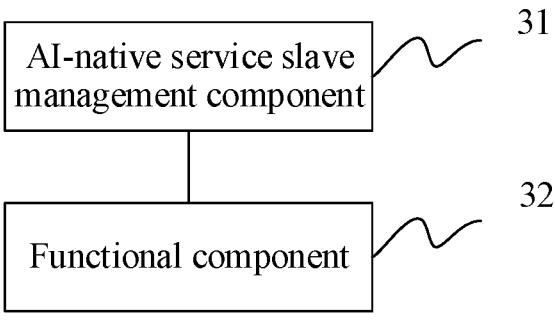
FIG. 10 is a structural schematic diagram of a third apparatus for transferring machine learning model parameters on the first device side according to an embodiment of the present application.

Referring to FIG. 10, on the first device side, a third apparatus for transferring machine learning model parameters in a mobile communication system according to an embodiment of the present application includes: an AI-native service slave management component 31, configured to receive a machine learning model file and the information of the target functional component sent by an AI-native service master management component in a second device; and distribute the machine learning model file into a target functional component in a first device according to the information of the target functional component; and a functional component 32, configured to install the machine learning model file.

In one embodiment, the AI-native service slave management component 31 is located in an application layer of the first device.

In one embodiment, the functional component 32 is further configured to notify the AI-native service slave management component that the machine learning model file has been installed; and the AI-native service slave management component 31 is further configured to: apply for a transmission resource between the first device and the second device from a transmission resource management component in the second device; apply for service registration to the AI-native service master management component by using the transmission resource obtained through application; and launch a service included in a latest machine learning model installed in the target functional component after obtaining a service registration permission from the AI-native service master management component.

Figure 11:
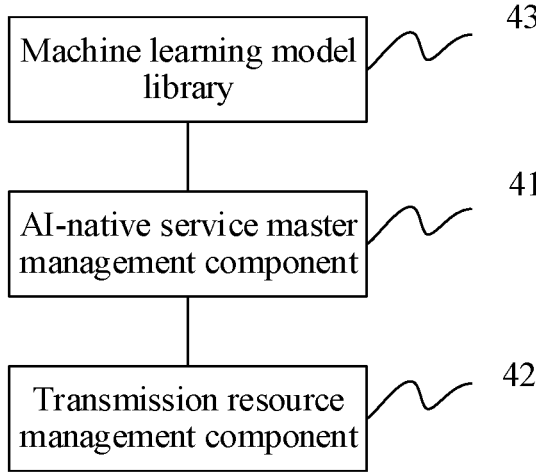
FIG. 11 is a structural schematic diagram of a third apparatus for transferring machine learning model parameters on the second device side according to an embodiment of the present application.

Referring to FIG. 11, on the second device side, a third apparatus for transferring machine learning model parameters in a mobile communication system according to an embodiment of the present application includes: an AI-native service master management component 41, configured to determine a target functional component in which a machine learning model is to be deployed in a first device and a corresponding machine learning model file; apply for a transmission resource between the first device and a second device from a transmission resource management component in the second device; and send the information of the target functional component and the machine learning model file to an AI-native service slave management component in the first device by using the transmission resource obtained by application; and a transmission resource management component 42, configured to provide the transmission resource between the first device and the second device.

In one embodiment, the AI-native service master management component 41 is located in an application layer of the second device.

In one embodiment, the apparatus further includes:

a machine learning model library 43, configured to store machine learning model files.

In one embodiment, the AI-native service master management component 41 is further configured to: receive a transmission resource application sent by the AI-native service slave management component in the first device, and allocate a transmission resource between the first device and the second device for the AI-native service slave management component.

In one embodiment, the AI-native service master management component 41 is further configured to: receive a service registration application sent by the AI-native service slave management component in the first device, and send a service registration permission to the AI-native service slave management component.

It should be noted that the division of components in the embodiments of the present application is illustrative, and is merely a kind of logical function division, and there may be other division methods in actual implementations. In addition, the functional components in each embodiment of the present application may be integrated into one processing component, or each component may exist alone physically, or two or more components may be integrated into one component. The above-mentioned integrated components can be implemented in the form of hardware, or can be implemented in the form of software functional components.

When the integrated component is implemented in the form of software functional component and sold or used as an independent product, it may be stored in a computer readable storage medium. Based on such understanding, the embodiments of the present application essentially or a part that contributes to the prior art or all or a part of the embodiments in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Component (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also refer to as the User Equipment ("UE" for short), Mobile Station ("MS" for short), Mobile Terminal ("MT" for short) or the like. In one embodiment, the terminal can have the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

In conclusion, the embodiments of the present application establish endogenous services inside the mobile communication system to support the operation of the machine learning model, and deploy and update the machine learning model by managing the endogenous services. The embodiments of the present application provide a unified method for deploying/updating a machine learning model, to facilitate operators to solve complex problems in the wireless mobile communication system by deploying/updating the machine learning model, and improve the network performance, including controlling the performance of the terminal side. The method of building the machine learning model with endogenous services can support complex machine learning models, and is more suitable for scenarios that are relatively insensitive to processing delays.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for transferring machine learning model parameters in a mobile communication system, applied to a first device, comprising:

receiving, by an artificial intelligence (AI)-native service slave management component in the first device, a machine learning model file and information of a target functional component sent by an AI-native service master management component in a second device, wherein the target functional component comprises at least one of a channel estimation component, a signal detection component, a channel decoding component, a channel quality indicator (CQI) measurement component, a synchronization detection component, or a transmitting antenna selection component; and distributing, by the AI-native service slave management component, the machine learning model file into the target functional component in the first device according to the information of the target functional component;

wherein the method further comprises:

notifying, by the target functional component, the AI-native service slave management component that the machine learning model file has been installed;

applying, by the AI-native service slave management component, for a transmission resource between the first device and the second device from a transmission resource management component in the second device;

applying, by the AI-native service slave management component, for service registration from the AI-native service master management component by using the transmission resource obtained through application; and launching, by the AI-native service slave management component, a service included in a latest machine learning model installed in the target functional component after obtaining a service registration permission from the AI-native service master management component;

wherein the first device is a terminal device in the mobile communication system, the second device is a base station device in the mobile communication system, and the transmission resource between the first device and the second device is a wireless transmission resource between the terminal device and the base station device; or wherein the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

2. The method according to claim 1, wherein the AI-native service slave management component is located in an application layer of the first device; and the AI-native service master management component is located in an application layer of the second device.

3. The method according to claim 1, further comprising: installing, by the target functional component, the machine learning model file.

4. A method for transferring machine learning model parameters in a mobile communication system, applied to a second device, comprising:

determining, by an AI-native service master management component in the second device, a target functional component in which a machine learning model is to be deployed in a first device and a corresponding machine learning model file, wherein the target functional component comprises at least one of a channel estimation component, a signal detection component, a channel decoding component, a channel quality indicator (CQI) measurement component, a synchronization detection component, or a transmitting antenna selection component;

applying, by the AI-native service master management component in the second device, for a transmission resource between the first device and the second device from a transmission resource management component in the second device; and sending, by the AI-native service master management component in the second device, information of the target functional component and the machine learning model file to an AI-native service slave management component in the first device by using the transmission resource obtained by application;

wherein the method further comprises:

receiving, by the AI-native service master management component in the second device, a transmission resource application sent by the AI-native service slave management component in the first device, and allocating the transmission resource between the first device and the second device to the AI-native service slave management component;

receiving, by the AI-native service master management component in the second device, a service registration application sent by the AI-native service slave management component in the first device, and sending a service registration permission to the AI-native service slave management component;

wherein the first device is a terminal device in the mobile communication system, the second device is a base station device in the mobile communication system, and the transmission resource between the first device and the second device is a wireless transmission resource between the terminal device and the base station device; or wherein the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

5. The method according to claim 4, wherein the AI-native service slave management component is located in an application layer of the first device; and the AI-native service master management component is located in an application layer of the second device.

6. An apparatus for transferring machine learning model parameters in a mobile communication system, applied to a first device, comprising:

a memory configured to store program instructions;

a processor configured to invoke the program instructions stored in the memory and execute according to an obtained program:

controlling an AI-native service slave management component in the first device to receive a machine learning model file and information of a target functional component sent by an AI-native service master management component in a second device, wherein the target functional component comprises at least one of a channel estimation component, a signal detection component, a channel decoding component, a channel quality indicator (CQI) measurement component, a synchronization detection component, or a transmitting antenna selection component; and controlling the AI-native service slave management component to distribute the machine learning model file into the target functional component in the first device according to the information of the target functional component, wherein the processor is further configured to invoke the program instructions stored in the memory and execute according to the obtained program:

controlling the target functional component to notify the AI-native service slave management component that the machine learning model file has been installed;

controlling the AI-native service slave management component to apply for a transmission resource between the first device and the second device from a transmission resource management component in the second device;

controlling the AI-native service slave management component to apply for service registration to the AI-native service master management component by using the transmission resource obtained through application; and controlling the AI-native service slave management component to launch a service included in a latest machine learning model installed in the target functional component after obtaining a service registration permission from the AI-native service master management component;

wherein the first device is a terminal device in the mobile communication system, the second device is a base station device in the mobile communication system, and the transmission resource between the first device and the second device is a wireless transmission resource between the terminal device and the base station device; or wherein the first device is a base station distributed unit in the mobile communication system, the second device is a base station centralized unit in the mobile communication system, and the transmission resource between the first device and the second device is a wired or wireless transmission resource between the base station distributed unit and the base station centralized unit.

7. The apparatus according to claim 6, wherein the AI-native service slave management component is located in an application layer of the first device; and the AI-native service master management component is located in an application layer of the second device.

8. The apparatus according to claim 6, wherein the processor is further configured to invoke the program instructions stored in the memory and execute according to the obtained program:

controlling the target functional component to install the machine learning model file.

9. An apparatus for transferring machine learning model parameters in a mobile communication system, applied to a second device, comprising:

a memory configured to store program instructions;

a processor configured to invoke the program instructions stored in the memory and execute according to an obtained program the method of claim 4.

10. The apparatus according to claim 9, wherein the AI-native service slave management component is located in an application layer of the first device; and the AI-native service master management component is located in an application layer of the second device.

11. The method according to claim 1, wherein the machine learning model file comprises an executable program file.

12. The method according to claim 4, wherein the machine learning model file comprises an executable program file.

13. The apparatus according to claim 6, wherein the machine learning model file comprises an executable program file.

14. The apparatus according to claim 9, wherein the machine learning model file comprises an executable program file.

* * * * *